United States Patent
Yamasaki et al.

(10) Patent No.: US 11,554,438 B2
(45) Date of Patent: Jan. 17, 2023

(54) METHOD AND APPARATUS FOR MANUFACTURING LAYERED MODEL

(71) Applicant: KOBE STEEL, LTD., Hyogo (JP)

(72) Inventors: Takemasa Yamasaki, Hyogo (JP); Tatsuya Fujii, Hyogo (JP); Shinji Sato, Hyogo (JP); Takeshi Yamada, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 61 days.

(21) Appl. No.: 16/758,201

(22) PCT Filed: Oct. 30, 2018

(86) PCT No.: PCT/JP2018/040236
§ 371 (c)(1),
(2) Date: Apr. 22, 2020

(87) PCT Pub. No.: WO2019/098006
PCT Pub. Date: May 23, 2019

(65) Prior Publication Data
US 2020/0324356 A1   Oct. 15, 2020

(30) Foreign Application Priority Data
Nov. 14, 2017  (JP) .............................. JP2017-219483

(51) Int. Cl.
*B23K 9/04*   (2006.01)
*B23K 9/095*   (2006.01)
(Continued)

(52) U.S. Cl.
CPC .............. *B23K 9/044* (2013.01); *B23K 9/095* (2013.01); *B23K 9/126* (2013.01); *B23K 9/32* (2013.01);
(Continued)

(58) Field of Classification Search
CPC ........ B23K 9/044; B23K 9/095; B23K 9/126; B23K 9/32; B33Y 10/00; B33Y 30/00; B33Y 50/02
See application file for complete search history.

(56) References Cited

U.S. PATENT DOCUMENTS

2005/0109818 A1   5/2005   Shimohata et al.
2011/0072660 A1*  3/2011   Flesch .................... B23K 9/048
                                                                29/888
(Continued)

FOREIGN PATENT DOCUMENTS

CN   104014912 A   9/2014
JP   H08-33979 A   2/1996
(Continued)

OTHER PUBLICATIONS

The extended European search report issued by the European Patent Office dated Jul. 19, 2021, which corresponds to European Patent Application No. 18879185.9-1002 and is related to U.S. Appl. No. 16/758,201.

(Continued)

*Primary Examiner* — Justin C Dodson
*Assistant Examiner* — Dilnessa B Belay
(74) *Attorney, Agent, or Firm* — Studebaker & Brackett PC

(57) ABSTRACT

A method for producing an additively manufactured object includes melting and solidifying a filler metal to form weld beads and depositing the weld beads adjoining each other, thereby forming a weld-bead layer, and repeatedly depositing a next weld-bead layer on the formed weld-bead layer to conduct additive manufacturing. The method includes a bead formation step of forming a new weld bead so as to fill a recess formed by at least three of the already formed weld beads, in a cross-section perpendicular to a longitudinal direction of the weld beads.

7 Claims, 11 Drawing Sheets

(51) Int. Cl.
*B23K 9/12* (2006.01)
*B23K 9/32* (2006.01)
*B33Y 10/00* (2015.01)
*B33Y 30/00* (2015.01)
*B33Y 50/02* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2011/0108527 | A1* | 5/2011 | Peters | B23K 9/09 219/74 |
| 2013/0032577 | A1* | 2/2013 | Lin | B23K 9/042 219/76.12 |
| 2019/0025798 | A1 | 1/2019 | Yamasaki | |

FOREIGN PATENT DOCUMENTS

| | | |
|---|---|---|
| JP | 2003266174 A | 9/2003 |
| JP | 2005152918 A | 6/2005 |
| JP | 2015182083 A | 10/2015 |
| JP | 2016030283 A | 3/2016 |
| JP | 2017024062 A * | 2/2017 |
| JP | 2017024062 A | 2/2017 |
| WO | 2017/141639 A1 | 8/2017 |

OTHER PUBLICATIONS

International Search Report issued in PCT/JP2018/040236; dated Jan. 29, 2019.

Written Opinion issued in PCT/JP2018/040236; dated Jan. 29, 2019.

* cited by examiner

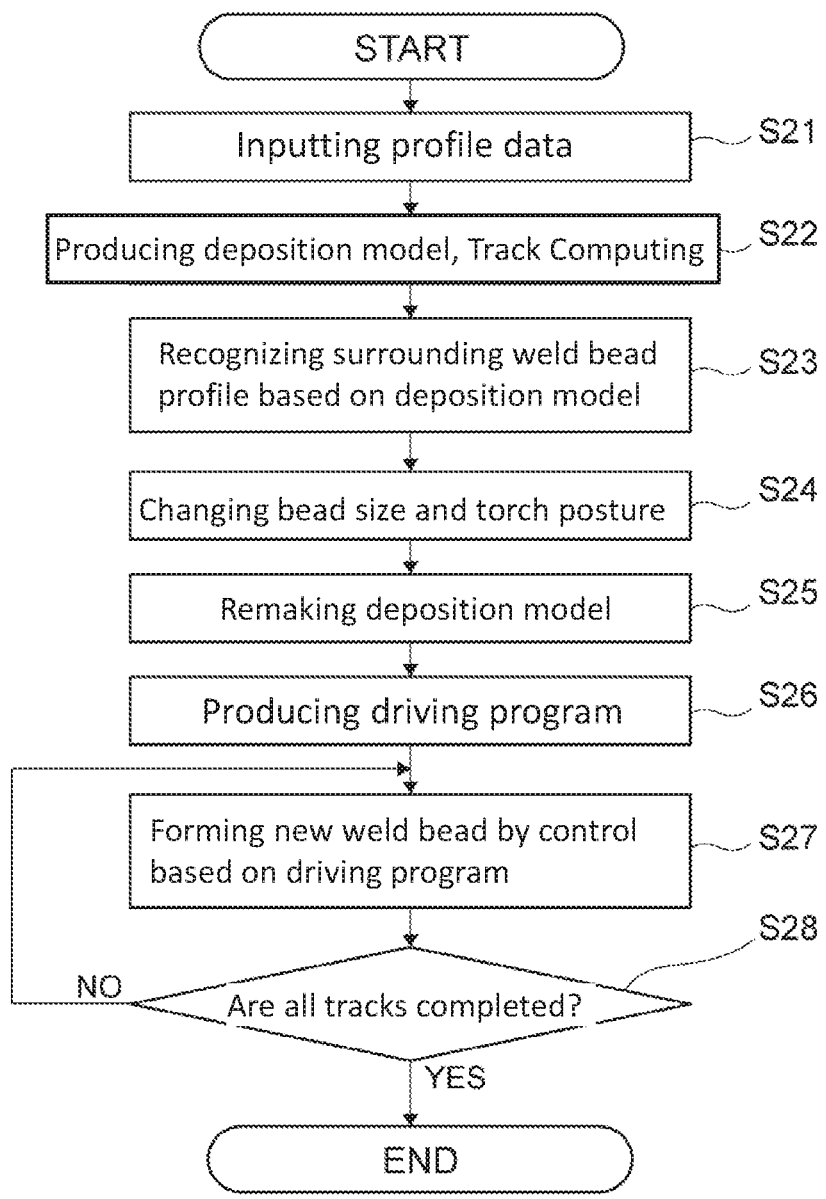

METHOD AND APPARATUS FOR MANUFACTURING LAYERED MODEL

TECHNICAL FIELD

The present invention relates to a method and an apparatus for producing an additively manufactured object.

BACKGROUND ART

In recent years, there is growing need for shaping with a 3D printer as production means, and researches and developments have been made in order to put the shaping from metallic materials into practical use. A 3D printer for shaping from a metallic material melts a metal powder or a metal wire using a heat source, such as a laser, electron beam, or arc, and deposits the molten metal, thereby producing an additively manufactured object.

For example, in a case of using an arc, a filler metal is melted with the arc and solidified to form weld beads and the weld beads are deposited in a plurality of layers, thereby producing an additively manufactured object. In this case, by depositing adjoining weld beads in a plurality of rows to form a weld-bead layer and depositing such a weld-bead layer multiple times, an additively manufactured object having a larger width than multilayer objects formed by depositing one weld bead can be produced.

With respect to techniques for forming a weld bead, Patent Literature 1 describes a technique for overlay welding in which the contact angle between a weld head that has been deposited and the base metal is measured and the torch is inclined depending on the measured contact angle to conduct overlay welding. Patent Literature 2 describes a technique for a process for producing a three-dimensional shaped object using a weld bead, in which an overlay torch is scanned while being inclined and thus the molten metal is less likely to drop.

CITATION LIST

Patent Literature

Patent Literature 1: JP-A-2015-182083
Patent Literature 2: JP-A-2003-266174

SUMMARY OF INVENTION

Technical Problem

However, the overlay welding described in Patent Literature 1 is a technique for forming one layer of a weld bead on a base metal, and Patent literature 1 contains no statement concerning a technique for newly forming weld beads on already deposited weld beads to produce an additively manufactured object. Meanwhile, in the technique described in cited literature 2, since weld beads having a given size are always deposited, the adjoining weld beads have a narrow recess formed therebetween where the outer bead surface is recessed inward. There is hence a possibility that in further forming a weld-bead layer on such weld-bead layer, the presence of the narrow recess might result in insufficient filling with the filter metal to leave unfilled portions. As a result, the finished additively manufactured object may have a welding defect such as blow holes, and be unable to have desired mechanical strength. In addition, in a case of producing an additively manufactured object having a complicated shape, there is a possibility that the torch might interfere with other portions.

The present invention has been achieved under these circumstances, and an object of the present invention is to provide a method and an apparatus for producing an additively manufactured object, the method and the apparatus being capable of preventing torch interference during the deposition of weld beads and of ensuring a penetration amount necessary and sufficient for preventing unfilled portions from being left at any narrow recesses between adjoining weld beams, thereby obtaining an additively manufactured object of high quality.

Solution to Problem

The present invention includes the following configurations.

(1) A method for producing an additively manufactured object, including melting and solidifying a filler metal to form weld beads and depositing the weld beads adjoining each other, thereby forming a weld-bead layer, and repeatedly depositing a next weld-bead layer on the formed weld-bead layer to conduct additive manufacturing, the method including a bead formation step of forming a new weld bead so as to fill a recess formed by at least three of the already formed weld beads, in a cross-section perpendicular to a longitudinal direction of the weld beads.

(2) An apparatus for producing an additively manufactured object by melting and solidifying a filler metal to form weld beads and depositing the weld beads adjoining each other, thereby forming a weld-bead layer, and repeatedly depositing a next weld-bead layer on the formed weld-bead layer to conduct additive manufacturing, the apparatus including:

a torch configured to support the filler metal and melt an end of the filler metal;

a torch-moving mechanism configured to change the torch in posture and position; and a control unit for forming the weld beads based on the method for producing an additively manufactured object described above.

Advantageous Effects of Invention

According to the present invention, it is possible to prevent torch interference during the deposition of weld beads and to ensure a penetration amount necessary and sufficient for preventing unfilled portions from being left at any narrow recesses between adjoining weld beams, thereby obtaining an additively manufactured object of high quality.

BRIEF DESCRIPTION OF DRAWINGS

FIG. 10 is a flowchart showing a second deposition procedure for an additively manufactured object.

DESCRIPTION OF EMBODIMENTS

Embodiments of the present invention are described below in detail by reference to the drawings.

Figure 1:
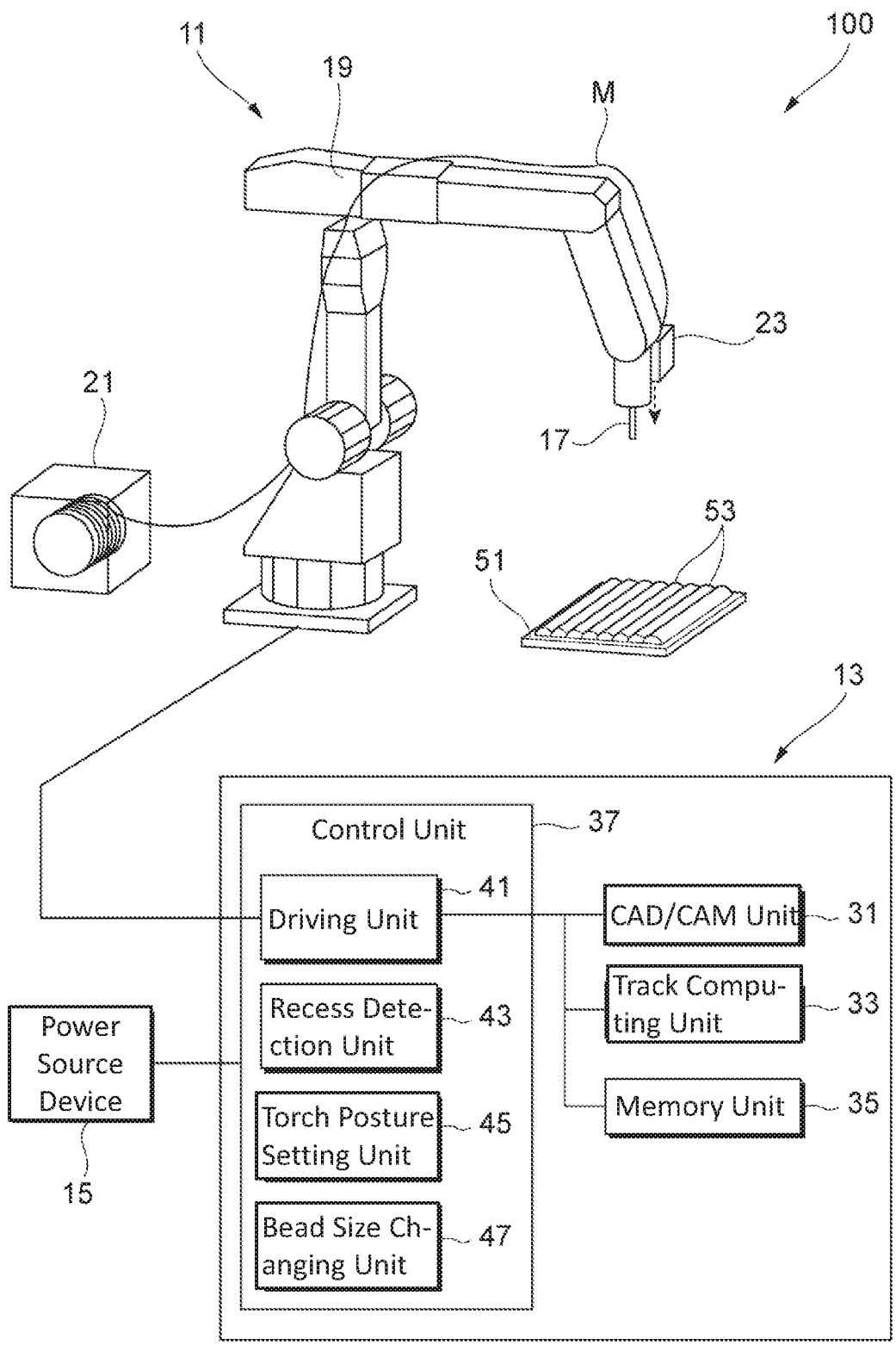
FIG. 1 is a diagrammatic view illustrating the configuration of an apparatus for producing an additively manufactured object of the present invention.

FIG. 1 is a diagrammatic view showing the configuration of an apparatus for producing an additively manufactured object of the present invention.

The apparatus 100 for producing an additively manufactured object of this configuration includes an additively manufacturing device 11, a deposition controller 13 to control the whole additively manufacturing device 11, and a power source device 15.

The additively manufacturing device 11 includes a welding robot 19 having a torch 17 provided to an end shaft thereof, and a filler-metal feed part 21 to feed a filler metal (welding wire) M to the torch 17. The end shaft of the welding robot 19 may be equipped with a profile detection sensor 23 for determining the shape of the material which is to become an additively manufactured object. As the profile detection sensor 23, various common sensors such as a laser sensor and a CCD/CMOS image sensor can be used.

The welding robot 19 is an articulated. robot, and the filler metal M is supported by the torch 17 attached to the end shaft of the robot arm such that the filler metal M can be continuously fed. The position and posture of the torch 17 can be arbitrarily set three-dimensionally within the range over which the robot arm is movable.

The torch 17 includes a shield nozzle (not shown) and a shielding gas is supplied from the shield nozzle. Arc welding may be conducted by either a consumable-electrode method, such as shielded-metal arc welding or carbon dioxide gas arc welding, or a non-consumable-electrode method, such as TIG welding or plasma arc welding. An appropriate arc welding method is selected depending on the additively manufactured object to be produced.

For example, in the case of a consumable-electrode method, a contact tip is disposed inside the shield nozzle, and a filler metal M to which a melting current is supplied is held by the contact tip. The torch 17, while holding the filler metal M, generates an arc from the end of the filler metal M in a shielding gas atmosphere. The filler metal M is fed from the filler-metal feed part 21 to the torch 17 by a feeding mechanism (not shown) attached to the robot arm or the like. The continuously fed filler metal M is melted and solidified while the torch 17 is moved, thereby forming a linear weld bead 53 which is a solid formed by melting and solidifying the filler metal M, on a base plate 51.

Heat sources for melting the filler metal M are not limited to the arc. For example, a method employing other heat source(s), such as a heating method in which an arc and a laser are used in combination, a heating method in which a plasma is used, or a heating method in which an electron beam or a laser is used, may be employed, in the case of heating with an electron beam or a laser, the quantity of applied heat can be more finely controlled to more properly maintain the state of the weld bead, thereby contributing to a further improvement in the quality of the additively manufactured object.

The deposition controller 13 includes a CAD/CAM unit 31, a track computing unit 33, a memory unit 35, and a control unit 37 to which these units have been connected.

The control unit 37 includes a driving unit 41 for driving the power source device 15 and the welding robot 19, and further includes a recess detection unit 43, a torch posture setting unit 45, and a bead size changing unit 47, details of which will be described later.

The CAD/CAM unit 31 inputs or produces profile data (CAD data, etc.) on the additively manufactured object to be produced and produces, in cooperation with the track computing unit 33, a weld-bead deposition model, which indicates a deposition procedure for producing the additively manufactured object. That is, the CAD/CAM unit 31 divides the profile data into data for each of a plurality of layers to produce layer profile data representing the profile of each layer. The CAD/CAM unit 31 then determines a movement track of the torch 17 based on the produced layer profile data on the deposition model. The CAD/CAM unit 31 produces a driving program for the welding robot 19, which moves the torch 17 to form weld beads, and for the power source device 15, based on the produced layer profile data and the movement track for the torch 17. The produced various data such as the driving program are stored in the memory unit 35.

The control unit 37 executes the driving program stored in the memory unit 35 and operates the welding robot 19, power supply device 15, etc. That is, the welding robot 19, in accordance with a command from the deposition controller 13, moves the torch 17 along the track therefor produced by the track computing unit 33 and melts the filler metal M with an arc to form a weld bead 53 on a base plate 51.

The base plate 51 is constituted of a metal plate such as a steel plate, and a metal plate being larger than the bottom surface of the additively manufactured object (surface of the lowermost layer) is typically used. The base plate 51 is not limited to plate-shaped ones, and may be a base having another shape such as a block or a rod.

As the filler metal M, any of all the commercial welding wires can be used. For example, wires provided for as MAG-welding or MIG-welding solid wires (JIS Z 3312) for mild steels, high tensile strength steels, and steels for low-temperature applications, and arc-welding flux-cored wires (JIS Z 3313) for mild steels, high tensile strength steels, and steels for low-temperature applications can be used.

Figure 2:
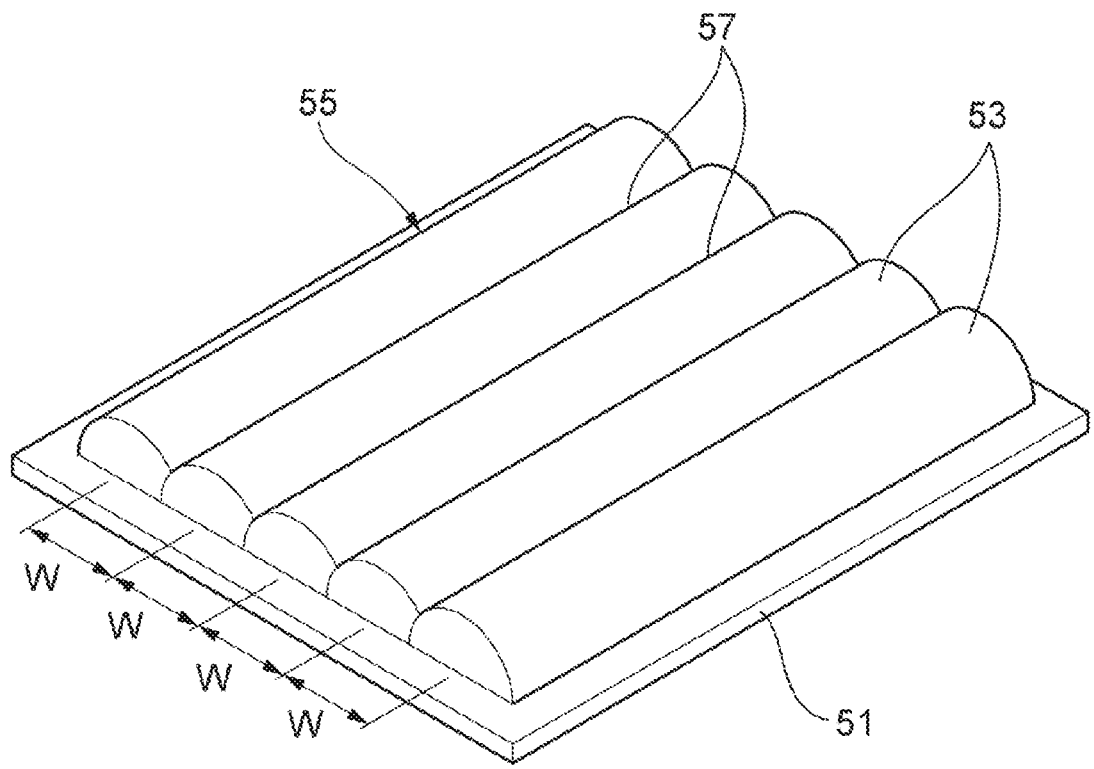
FIG. 2 is a schematic perspective view illustrating a weld-bead layer formed by arranging a plurality of linear weld beads in parallel on a base plate.

The apparatus 100 for producing an additively manufactured object having the configuration described above deposits a plurality of linear weld beads 53 on a base plate 51 such that the weld beads 53 adjoin each other, thereby forming a weld-bead layer 55, as FIG. 2 shows an example thereof. A next weld-bead layer is deposited on this weld-bead layer 55 and the deposition is repeated, thereby producing an additively manufactured object.

The first weld-bead layer 55 formed on the base plate 51 is composed of a plurality of rows of weld beads 53. As schematically shown in FIG. 2, each of the weld beads 53 has a cross-sectional shape which is bulging approximately upward. Since the weld beads 53 are linearly formed at given intervals W, narrow recesses 57 recessed from the tops of the weld beads 53 are formed between each of the weld beads 53.

In a case where narrow recesses 57 are present between the weld beads 53, when an upper weld-bead layer is deposited thereon, unfilled portions are prone to be left in the newly formed weld beads 53. Hence, a finished additively manufactured object may have blow holes formed therein.

Consequently, in the apparatus 100 for producing an additively manufactured object having the configuration described above, when a weld-bead layer is newly formed on an already formed weld-bead layer 55, the size of each weld bead is changed so as not to leave an especially narrow recess. Because of this, in forming a next weld-bead layer, unfilled portions due to narrow recesses are not formed and the formation of defects such as blow holes in the additively manufactured object can be prevented.

Procedures for forming weld beads while preventing the narrow recesses from remaining unfilled as described above are explained below in detail.

First Deposition Procedure for Additively Manufactured Object

Figure 3:
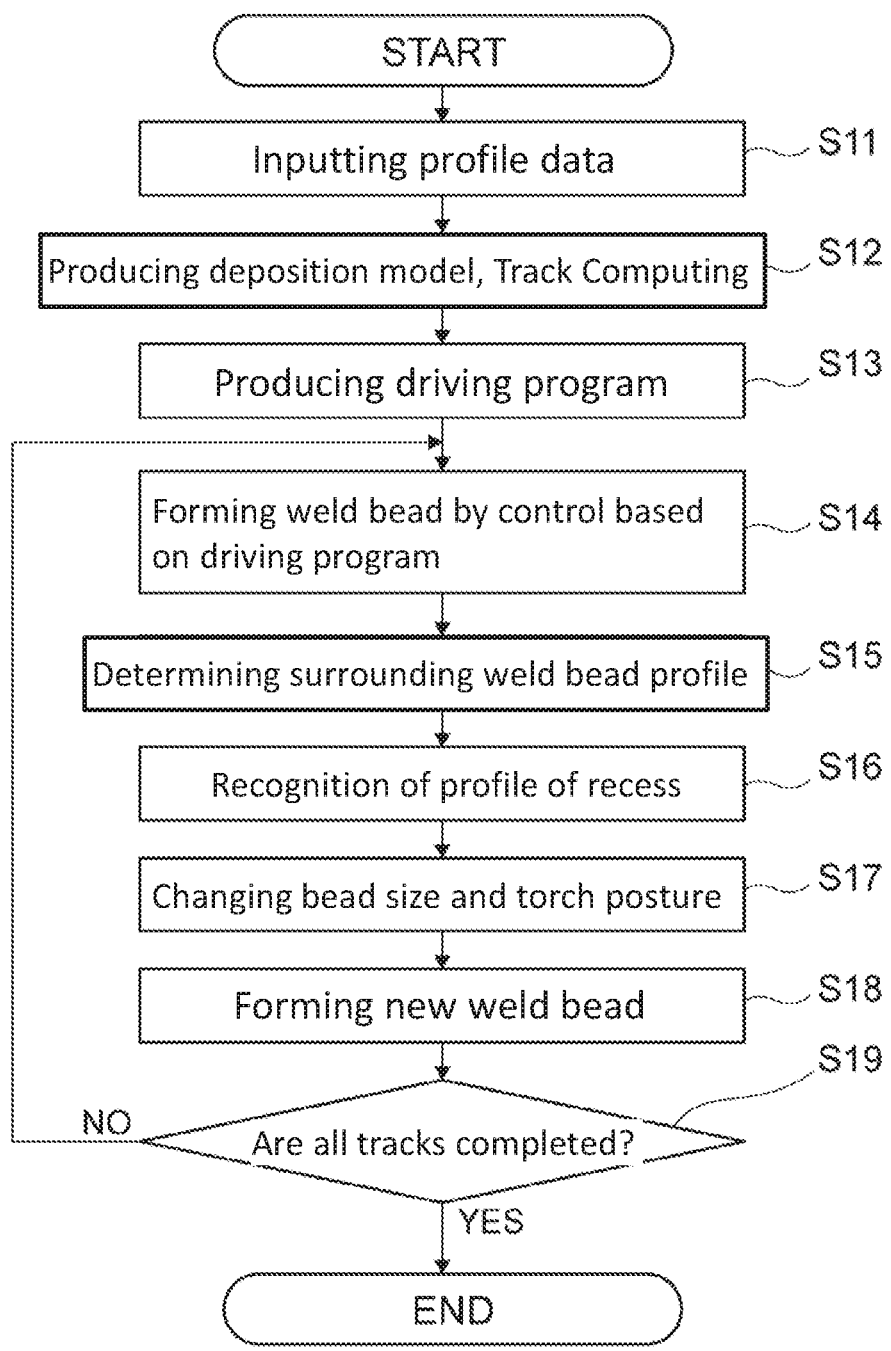
FIG. 3 is a flowchart showing a first deposition procedure for an additively manufactured object.

FIG. 3 is a flowchart showing a first deposition procedure for producing an additively manufactured object. This procedure is explained in order based on the flowchart of FIG. 3.

First, profile data (CAD data, etc.) on the additively manufactured object are inputted to the control unit 37 shown in FIG. 1 (S11). The control unit 37, based on the inputted profile data, produces a weld-bead deposition model which indicates a deposition procedure for producing the additively manufactured object.

Figure 4:
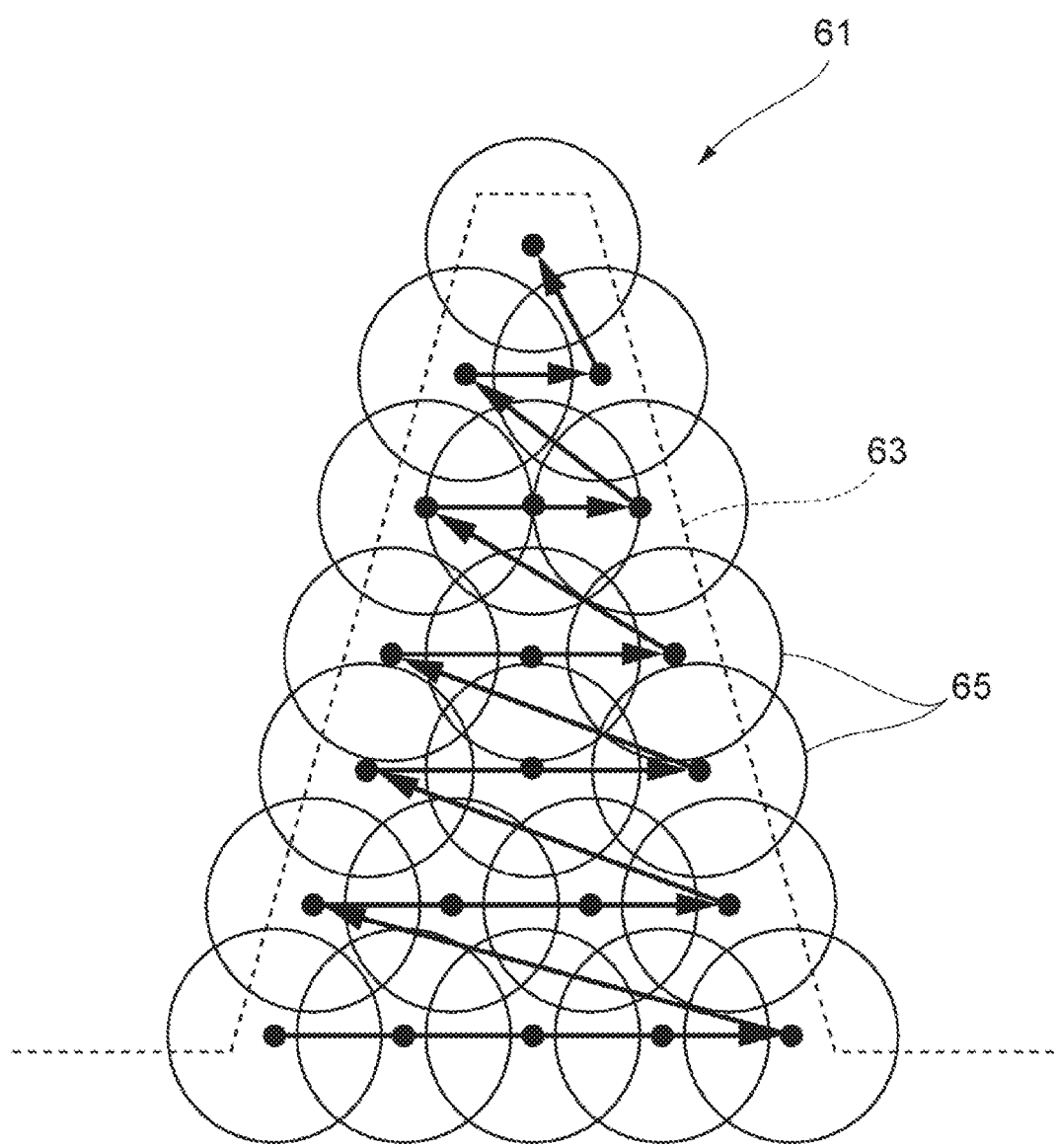
FIG. 4 is a schematic view illustrating an example of a deposition model produced from profile data.

FIG. 4 is a schematic view illustrating an example of a deposition model 61 produced from the profile data.

The deposition model 61 is a model formed by successively disposing weld beads (virtual beads 65) from a lower layer toward an upper layer as shown by the arrows in the figure such that the thus-deposited weld beads include the outline 63 of the additively manufactured object indicated by the broken line in the figure. This deposition model 61 is analytically determined from the inputted profile data based on an appropriate algorithm such that weld beads can be efficiently deposited depending on various conditions including the shape, material, heat input, etc. Thus, a track (movement track) for the torch 17 is determined (S12).

The CAD/CAM unit 31 produces a driving program based on various data including the determined track for the torch 17, positions where formation of weld beads starts and ends, and various welding conditions (S13).

The control unit 37 executes the produced driving program to drive the welding robot 19, the power source device 15, and other parts and form weld beads (S14). Besides being produced by the deposition controller 13 as shown above, the driving program may be produced by another computer device connected to the deposition controller 13 via a cable, communication, or recording medium.

Figure 5:
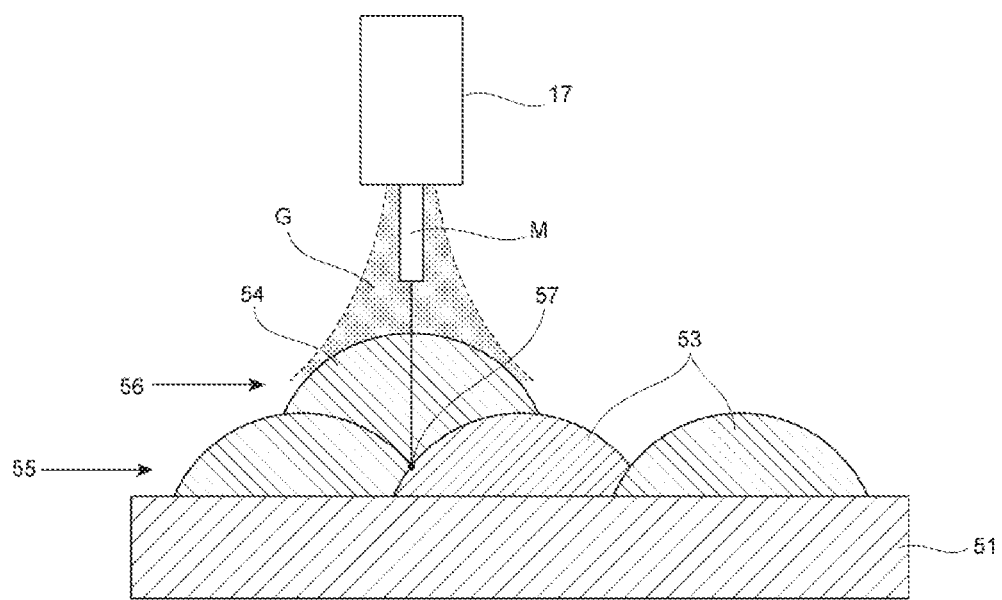
FIG. 5 is a schematic view illustrating a step of forming a second-layer weld bead on a first weld-bead layer on a base plate.

FIG. 5 is a schematic view illustrating a step of forming a second-layer weld bead 54 on a first weld-bead layer 55 on a base plate 51.

In accordance with the driving program, the control unit 37 first forms weld beads 53 in a plurality of rows on a base plate 51 such that the weld beads 53 adjoin each other. Thus, a first weld-bead layer 55 is formed.

Subsequently, in accordance with the driving program, the position and posture of the torch 17 are controlled and an arc is generated while a shielding gas G is supplied, and a weld bead 54 is formed on the first weld-bead layer 55. In the example shown in the figure, a weld bead 54 is formed using a narrow recess 57 of the first weld-bead layer 55 as a target position.

In forming a second-layer weld bead 54, the profile detection sensor 23 attached to the end shaft of the welding robot 19 determines the profile of portions around the position where the weld head is to be formed next (S15).

Figure 6:
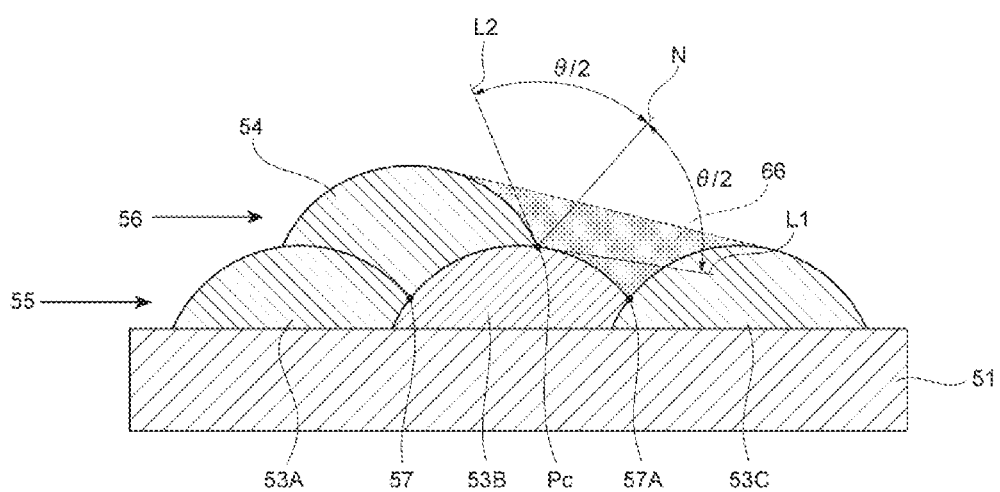
FIG. 6 is a diagrammatic enlarged view illustrating a recess formed by the weld beads of FIG. 5.

FIG. 6 is a diagrammatic enlarged view illustrating a recess 66 formed by weld beads of FIG. 5.

A weld bead 54 is formed using, as a target position, a narrow recess 57 between a pair of adjoining weld beads 53A and 53B in the first weld-bead layer 55. In this deposition, the control unit 37 recognizes the profile of one recess 66 formed by the three already formed weld beads 54, 53B, and 53C, based on the profile detection data obtained through the detection by the profile detection sensor 23 (S16). The bead size of the weld bead to be newly deposited and the posture of the torch 17 are changed as necessary such that the recess 66 is filled up (S17). Subsequently, the new weld bead 54A (see FIG. 7) is formed while the bead size setting and the posture of the torch 17 are suitably changed (S18).

Although the recess 66 of the example shown in the figure is formed by the three weld beads 54, 53B, and 53C, the recess 66 may be formed by weld beads further including other weld beads.

Specifically, the new weld bead 54A which fills up the recess 66 is formed in the following manner.

As shown in FIG. 6, the boundary between the outer surface of the weld bead 54 and the outer surface of the weld bead 53B is designated as Pc (the right-hand-side boundary of the weld bead 54 in the figure). A tangent to the outer surface of the weld bead 53B at the boundary Pc is designated as L1, and a tangent to the outer surface of the weld bead 54 at the boundary Pc is designated as L2. Furthermore, the angle between the tangents L1 and L2 is designated as θ, and the bisector of the angle θ is designated as N.

Figure 7:
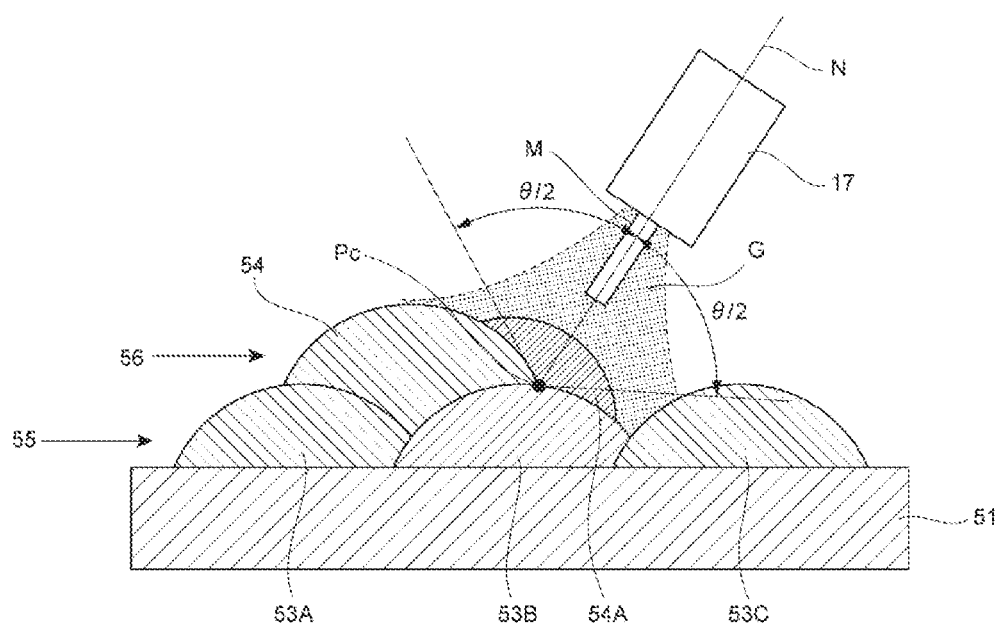
FIG. 7 is a view schematically illustrating a step of forming a new weld bead while suitably changing the bead size and the torch posture.

A next weld bead to adjoin the weld bead 54 is formed using the boundary Pc as a target position. FIG. 7 is a view schematically illustrating a step of forming the next weld bead 54A.

As shown in FIG. 7, by the torch posture setting unit 45 (see FIG. 1), the direction of the torch axis of the torch 17 is set to be the same as the direction of the line N during the formation of the next weld bead. The torch axis need not completely coincide with the line N. For example, the direction of the torch axis can be within the range of ±40°, preferably ±20°, more preferably ±10°, in terms of deviation from the line N, with the boundary Pc as the center. As long as the direction of the torch axis is within the range, the torch 17 does not interfere with the surrounding weld beads, etc., and a satisfactory weld bead can be formed. The target position for forming the weld bead 54A is not limited to the boundary Pc and may be a narrow recess 57A (see FIG. 6) between the weld bead 53B and the weld bead 53C. That is, any of the boundaries between the three already formed weld beads 54, 53B, and 53C may be used as a target position for forming the new weld bead 54A.

The control unit 37 causes the bead size changing unit 47 to change the bead size of the new weld bead 54A as necessary.

Figure 8A:
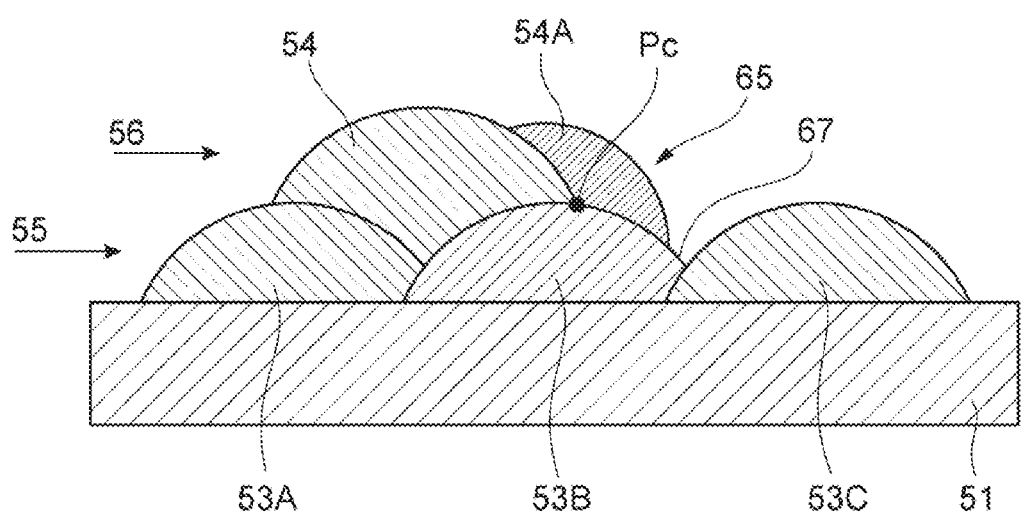
FIG. 8A is a cross-sectional view of an additively manufactured object being produced in which the bead size of a newly formed weld bead is too small.
Figure 8B:
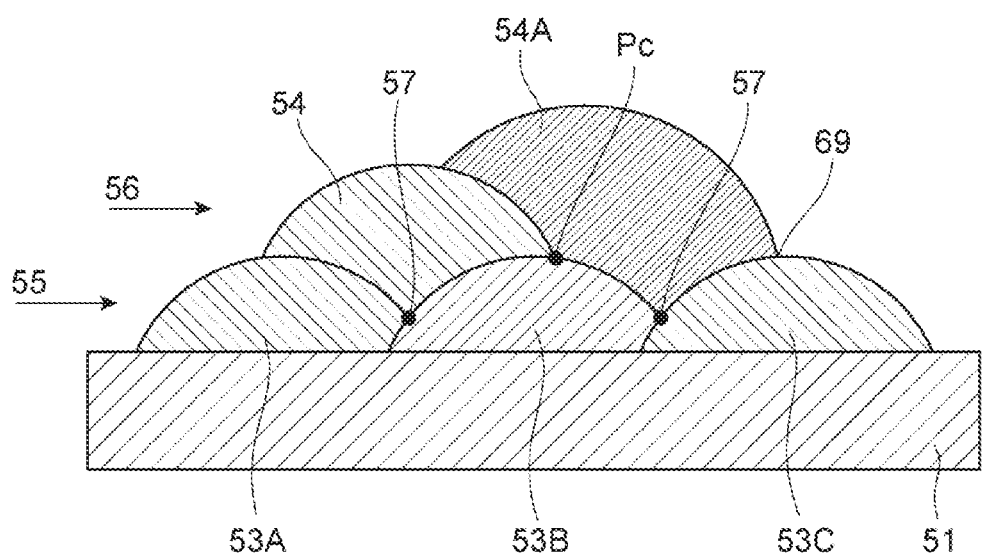
FIG. 8B is a cross-sectional view of an additively manufactured object being produced in which the bead size of a newly formed weld bead is proper.

FIG. 8A is a cross-sectional view of an additively manufactured object being produced in which the bead size of the newly-formed weld bead 54A is too small. FIG. 8B is a cross-sectional view of an additively manufactured object being produced in which the bead size of the newly-formed weld bead 54A is proper.

In the case of the weld bead 54A shown in FIG. 8A, in a position where the outer surface of the weld bead 54A is in contact with the weld bead 53B, a narrow recess 67 is formed between the weld bead 544 and the weld bead 53C. This narrow recess 67 is formed as an especially tapered recess where the outer surfaces of the weld heads 54A and 53C are close to each other. In a case where a next weld head is formed adjacently with the narrow recess 67 remaining, this narrow recess 67 is prone to remain as an unfilled portion. There is hence a possibility that a blow hole is formed in the finished additively manufactured object.

A weld bead 54A is hence formed such that the weld bead 54A completely covers the exposed outer surface of the weld bead 53B and extends to the adjoining weld bead 53C, as shown in FIG. 8B. Thus, the narrow recess 67 shown in FIG. 8A is filled up with the weld bead 54A. Although in this case a narrow recess 69 is formed between the weld bead 544 and the weld bead 53C, this narrow recess 69 has a degree of tapering which is lower than that of the narrow recess 67 and substantially the same as that of the narrow recesses 57 formed in the first weld-bead layer 55. Consequently, even in a case where a next weld bead is formed so as to adjoin the weld bead 54A, the weld bead can be satisfactorily formed without leaving an unfilled portion.

For forming the weld bead 54A so as to have the bead size shown in FIG. 8B, it is required to change the welding conditions, for example, to increase the rate of feeding the filler metal M, the welding voltage, etc. or to lower the moving speed of the torch 17. The control unit 37 estimates the welding conditions based on the recognition result of recess profiles recognized by the recess detection unit 43, using predetermined tables or computing equations, such that the narrow recess 67 shown in FIG. 8A is filled up without fail. The weld bead 54A is then formed so as to have the estimated bead size.

This control regarding bead size change basically is feedforward control. However, by setting the portion to be examined by the profile detection sensor 23 at a forward area along the direction of bead formation and carrying out the process by the time when the position for recess profile determination reaches the position for weld-bead formation, the bead size of the weld bead can be changed in substantially a real-time manner.

Steps S14 to S18 described above are repeated until all the tracks are completed (S19). After completion of all the tracks, the formation of weld beads is stopped and the welding robot 19 is moved to the initial standby position. Thus, a high-quality additively manufactured object free from unfilled portions is obtained by forming weld beads while always keeping the bead sizes proper.

Figure 9:
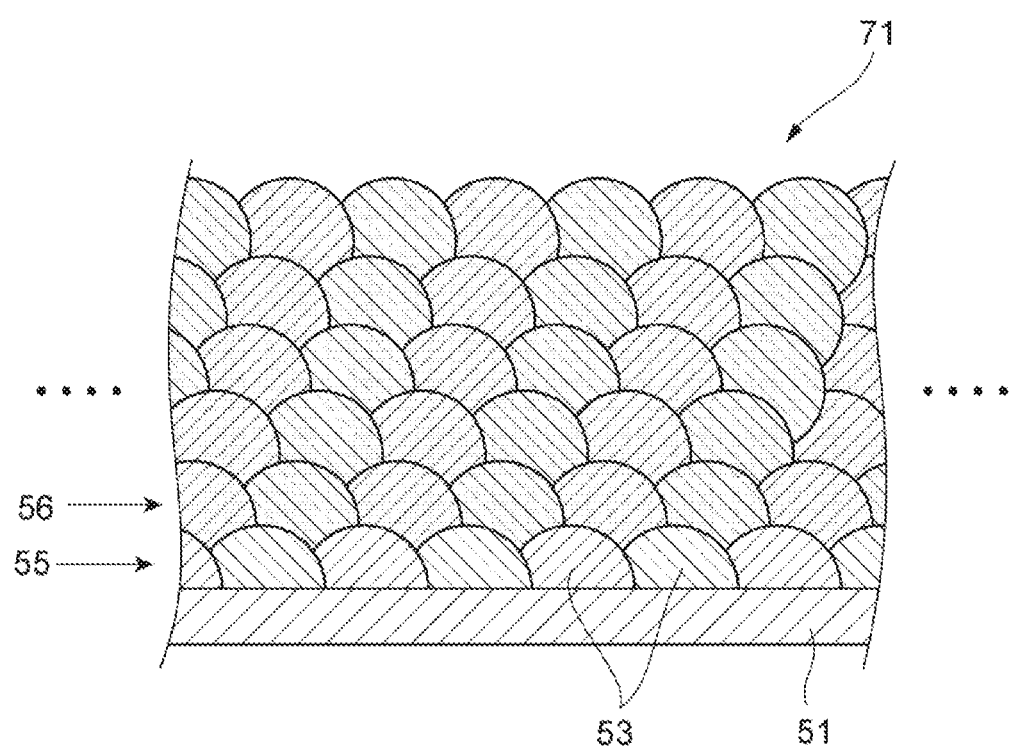
FIG. 9 is a schematic cross-sectional view of an additively manufactured object produced by an apparatus for producing an additively manufactured object.

FIG. 9 is a diagrammatic cross-sectional view of an additively manufactured object produced by an apparatus for producing an additively manufactured object.

With the apparatus 100 for producing an additively manufactured object having the configuration described above, no narrow recess having an especially high degree of tapering (narrow recess 67 shown in FIG. 8A) is formed as in the example shown in FIG. 9. Consequently, the weld-bead layers ranging from the lowermost layer adjacent to the base plate 51, to the uppermost layer contain no blow hole and a satisfactory additively manufactured object 71 is obtained. Because of this, the additively manufactured object 71 is a satisfactory built-up object with lower deterioration of strength and evenness in mechanical property. This additively manufactured object 71 is applicable to mechanical structural components especially required to have strength.

In this configuration, weld beams are formed while profiles are determined by the profile detection sensor 23. Because of this, even in a case where an already formed weld beam has undergone a change in the profile which is not expectable at the stage of designing, the beam size of a new weld beam and the torch posture are set based on the profile which has changed. Hence, a proper weld beam can always be formed, such that high quality additively manufactured objects can be stably produced.

Second Deposition Procedure for Additively Manufactured Object

Next, a second deposition procedure for an additively manufactured object is explained.

FIG. 10 is a flowchart showing a second deposition procedure for producing an additively manufactured object.

First, profile data (CAD data, etc.) on the additively manufactured object are inputted to the control unit 37 shown in FIG. 1 (S21). The control unit 37, based on the inputted profile data, produces a weld-bead deposition model which indicates a procedure for producing the additively manufactured object and a movement track for the torch 17 (S22), in the same manner as in the first deposition procedure described above.

The control unit 37 recognizes, from the produced deposition model, the profile of weld beads lying around a target position where a weld bead is to be formed. Specifically, the control unit 37 recognizes the profile of a recess 66 formed by three already formed weld beads 54, 53B, and 53C as shown in FIG. 6, and this recognition is made with respect to all the tracks in the second and upper layers over the first weld-head layer 55 (S23).

The bead size of the weld bead to be newly deposited and the posture of the torch 17 are changed as necessary such that the recess 66 is filled up (S24). The control unit 37 thus suitably changes the bead size and the posture of the torch 17 to suppose the new weld bead, and remakes a deposition model (S25).

Next, the control unit 37 produces a driving program based on the remade deposition model (S26) and executes the driving program to drive the welding robot 19, the power source device 15, and other parts, thereby forming a weld bead (S27).

Step S27 described above is repeated until all the tracks are completed (S28). After completion of all the tracks, the formation of weld beads is stopped and the welding robot 19 is moved to the initial standby position. Thus, a high-quality additively manufactured object free from unfilled portions is obtained by forming weld beads while always keeping the bead sizes proper.

In this deposition procedure, the profile of a recess to be formed is estimated from a produced deposition model and the bead size of a weld bead is changed as necessary such that the recess having the estimated profile is filled up with the weld bead. There is hence no need of determining the profile of weld beads one by one, and it is only required to control the welding robot 19 and the power source device 15 in a predetermined manner. Consequently, weld beads can be easily formed by batch processing, making it possible to highly efficiently produce an additively manufactured object.

As described above, the following matters are disclosed in this description.

(1) A method for producing an additively manufactured object, including melting and solidifying a filler metal to form weld beads and depositing the weld beads adjoining each other, thereby forming a weld-bead layer, and repeatedly depositing a next weld-bead layer on the formed weld-bead layer to conduct additive manufacturing, the method including a bead formation step of forming a new weld bead so as to fill a recess formed by at least three of the already formed weld beads, in a cross-section perpendicular to a longitudinal direction of the weld beads.

In this method for producing an additively manufactured object, an especially tapered portion of one recess formed by at least three already formed weld beads, which lies between adjoining beads, is filled up with a new weld bead without fail. As a result, formation of a next weld bead can be prevented from leaving an unfilled portion and the quality of an additively manufactured object can be improved.

(2) The method for producing an additively manufactured object according to (1), in which in the bead formation step, a bead size of the new weld bead is changed such that the recess is filled up.

In this method for producing an additively manufactured object, by changing the bead size of the new weld bead, the recess can be filled up without fail by one operation of weld-bead formation.

(3) The method for producing an additively manufactured object according to (1) or (2), in which in the bead formation step, any of the boundaries between the at least three already formed weld beads is used as a target position for forming the new weld bead.

In this method for producing an additively manufactured object, since any of boundaries between weld-bead layers in a recess is used as a target position to form a new weld bead, the weld bead can be efficiently formed from the bottom of the recess, and the recess can be evenly filled up.

(4) The method for producing an additively manufactured object according to (3), in which in the bead formation step, a torch axis direction of a torch to support the filler metal and melt an end of the filler metal is set to coincide with a bisector of an angle between tangents to one and the other of a pair of weld beads adjoining each other at the boundary being the target position, and the weld bead is formed.

In this method for producing an additively manufactured object, since the direction of the torch axis of the torch coincides with the bisector of the angle formed by the tangents, bead formation can be efficiently conducted while the interference with the torch is prevented.

(5) The method for producing an additively manufactured object according to any one of (1) to (4), the method including: detecting a profile of portions around the recess by a profile detection sensor; and estimating a bead size of the new weld bead to fill up the recess by use of the detected profile detection data on the recess, in which in the bead formation step, the new weld bead having the estimated bead size is formed in the recess.

In this method for producing an additively manufactured object, since a bead size is estimated from the profile of portions around the recess determined by a profile detection sensor, a bead size suitable for the profile of the already formed weld beads is obtained.

(6) The method for producing an additively manufactured object according to any one of (1) (4), the method including:

inputting profile data on the additively manufactured object;

producing a deposition model for the weld beads indicating a deposition procedure for producing the additively manufactured object based on the profile data;

extracting the recess from the deposition model; and estimating a bead size of a weld bead to be formed in the recess such that the recess is filled up with the weld bead and remaking the deposition model such that the weld bead has the estimated bead size, in which in the bead formation step, the weld bead is formed based on the remade deposition model.

In this method for producing an additively manufactured object, since a bead size is analytically determined from a deposition model, weld beads can be formed by predetermined batch processing, making it easy to perform robot control, etc.

(7) An apparatus for producing an additively manufactured object by melting and solidifying a filler metal to form weld beads and depositing the weld beads adjoining each other, thereby forming a weld-bead layer, and repeatedly depositing a next weld-bead layer on the formed weld-bead layer to conduct additive manufacturing, the apparatus including:

a torch configured to support the filler metal and melt an end of the filler metal;

a torch-moving mechanism configured to change the torch in posture and position; and a control unit for forming the weld beads based on the method for producing an additively manufactured object according to any one of (1) to (6).

With this apparatus for producing an additively manufactured object, an especially tapered portion between adjoining beads in a recess formed by at least three already formed weld beads can be filled up with a new weld bead without fail. As a result, formation of a next weld bead can be prevented from leaving an unfilled portion and the quality of an additively manufactured object can be improved.

(8) The apparatus for producing an additively manufactured object according to (7), in which the torch-moving mechanism is an articulated robot.

With this apparatus for producing an additively manufactured object, the torch can be directed toward any desired direction by the articulated robot, thereby improving the degree of freedom of forming weld beads.

The present invention is not limited to the embodiments described above, and the combination of configurations of the embodiments with each other or the modification or application by a person skilled in the art based on the statements in the description and common techniques are also expected in the present invention and are included in the claimed range.

This application is based on Japanese patent application No. 2017-219483 filed on Nov. 14, 2017, the contents of which are incorporated herein by reference.

REFERENCE SIGNS LIST

11 Additively manufacturing device
13 Deposition controller
17 Torch
19 Welding robot (articulated robot)
23 Profile detection sensor
37 Control unit
43 Recess detection unit
45 Torch posture setting unit
47 Bead size changing unit
53, 54, 54A Weld bead
55, 56 Weld-bead layer
57, 57A, 67 Narrow recess 61 Deposition model
66 Recess
100 Apparatus for producing additively manufactured object

The invention claimed is:

1. A method for producing an additively manufactured object, comprising melting and solidifying a filler metal to successively form weld beads one weld bead at a time, and depositing the weld beads adjoining each other, thereby forming a weld-bead layer, and repeatedly depositing a next weld-bead layer one weld bead at a time successively on the formed weld-bead layer to conduct additive manufacturing, the method comprising a bead formation step of forming a new weld bead so as to fill a recess formed by at least three previously-formed weld beads of the weld-bead layer and the next weld-bead layer, in a cross-section perpendicular to a longitudinal direction of the weld beads;

the method further comprising:

inputting predetermined profile data on the additively manufactured object prior to forming any of the weld beads;

prior to forming any of the weld beads, producing a deposition model for the weld beads including a deposition procedure for producing the additively manufactured object based on the profile data;

extracting the recess from the deposition model prior to forming any of the weld beads; and estimating a bead size of a weld bead to be formed in the recess such that the recess is filled up with the weld bead and remaking the deposition model, prior to forming any of the weld beads, such that the weld bead has the estimated bead size, wherein in the bead formation step, the new weld bead is formed based on the remade deposition model.

2. The method for producing an additively manufactured object according to claim 1, wherein in the bead formation step, a bead size of the new weld bead is changed such that the recess is filled up.

3. The method for producing an additively manufactured object according to claim 1, wherein in the bead formation step, any of boundaries between the at least three previously formed weld beads is used as a target position for forming the new weld bead.

4. The method for producing an additively manufactured object according to claim 2, wherein in the bead formation step, any of boundaries between the at least three previously formed weld beads is used as a target position for forming the new weld bead.

5. The method for producing an additively manufactured object according to claim 3, wherein in the bead formation step, a torch axis direction of a torch to support the filler metal and melt an end of the filler metal is set to coincide with a bisector of an angle between a tangent to one of a pair of the previously formed weld beads and a tangent to another of the pair of the previously formed weld beads, the pair of the previously formed weld beads adjoining each other at the boundary which is the target position.

6. The method for producing an additively manufactured object according to claim 4, wherein in the bead formation step, a torch axis direction of a torch to support the filler metal and melt an end of the filler metal is set to coincide with a bisector of an angle between a tangent to one of a pair of the previously formed weld beads and a tangent to another of the pair of the previously formed weld beads, the pair of the previously formed weld beads adjoining each other at the boundary which is the target position.

7. The method for producing an additively manufactured object according to claim 1, the method comprising:

detecting a profile of portions around the recess by a profile detection sensor; and estimating a bead size of the new weld bead to fill up the recess by use of the detected profile detection data on the recess, wherein in the bead formation step, the new weld bead having the estimated bead size is formed in the recess.

* * * * *